(12) United States Patent
Niu et al.

(10) Patent No.: US 7,616,699 B2
(45) Date of Patent: Nov. 10, 2009

(54) METHOD OF SOFT BIT METRIC CALCULATION WITH DIRECT MATRIX INVERSION MIMO DETECTION

(75) Inventors: Huaning Niu, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 526 days.

(21) Appl. No.: 11/104,722

(22) Filed: Apr. 12, 2005

(65) Prior Publication Data

US 2006/0227903 A1 Oct. 12, 2006

(51) Int. Cl.
*H04B 7/02* (2006.01)

(52) U.S. Cl. .................. 375/267; 375/260; 375/341; 375/148; 375/233; 375/350; 455/434; 714/792; 382/103; 382/165

(58) Field of Classification Search .............. 375/341, 375/260, 148, 240.2, 350, 233, 147, 267; 455/434; 714/792; 382/103, 165; 370/342; 600/476
See application file for complete search history.

(56) References Cited

U.S. PATENT DOCUMENTS

| | | | | |
|---|---|---|---|---|
| 6,421,553 | B1 * | 7/2002 | Costa et al. | 600/476 |
| 6,629,041 | B1 * | 9/2003 | Marbach | 702/30 |
| 7,197,690 | B2 * | 3/2007 | Shen et al. | 714/792 |
| 7,236,554 | B2 | 6/2007 | Gupta | |
| 7,295,624 | B2 | 11/2007 | Onggosanusi et al. | |
| 7,298,772 | B1 | 11/2007 | Neerudu et al. | |
| 7,308,026 | B2 | 12/2007 | Purho | |
| 7,313,172 | B2 * | 12/2007 | Pan et al. | 375/148 |
| 7,315,566 | B2 | 1/2008 | Tanno et al. | |
| 7,315,576 | B1 | 1/2008 | van Nee et al. | |
| 7,386,058 | B2 | 6/2008 | Fujii | |
| 7,397,826 | B2 | 7/2008 | Gorokhov | |
| 7,415,059 | B2 | 8/2008 | Chadha et al. | |
| 7,447,277 | B2 | 11/2008 | Yajima et al. | |
| 2003/0053661 | A1 * | 3/2003 | Magarey | 382/103 |
| 2003/0063654 | A1 | 4/2003 | Onggosanusi et al. | |
| 2004/0005022 | A1 | 1/2004 | Zhu et al. | |
| 2004/0042532 | A1 * | 3/2004 | Artamo et al. | 375/148 |

(Continued)

OTHER PUBLICATIONS

G. D. Golden, C. J. Foschini, R. A. Valenzuela and P. W. Wolniansky, "Detection algorithm and initial laboratory results using V-BLAST space-time communication architecture," Electronics Letters, pp. 14-16, vol. 35, No. 1.

(Continued)

*Primary Examiner*—Sudhanshu C Pathak
(74) *Attorney, Agent, or Firm*—Kenneth L. Sherman, Esq.; Michael Zarrabian, Esq.; Myers Andras Sherman LLP

(57) ABSTRACT

A telecommunication MIMO receiver implements soft bit metric calculation with direct matrix inversion MIMO detection. The receiver has a detector that detects data symbols in a received signal by determining distances between received signal points and constellation points; a scaler that scales the distances using a scaling factor; and a soft bit metric calculator that uses the scaled distances to calculate scaled soft bit metrics. The receiver can also have a decoder that decodes the soft bit metrics to determine data values in the received signals. Preferably, the receiver also has a quantizer that dynamically quantizes the soft bit metrics before decoding by the decoder.

25 Claims, 5 Drawing Sheets

U.S. PATENT DOCUMENTS

| | | | |
|---|---|---|---|
| 2004/0076248 A1* | 4/2004 | Purho | 375/350 |
| 2004/0120574 A1* | 6/2004 | Rosenholtz | 382/165 |
| 2004/0223480 A1 | 11/2004 | Nguyen et al. | |
| 2004/0240545 A1* | 12/2004 | Guleryuz | 375/240.2 |
| 2005/0169361 A1* | 8/2005 | Yousef et al. | 375/233 |
| 2005/0220175 A1 | 10/2005 | Zhou | |
| 2005/0265467 A1* | 12/2005 | Dabak et al. | 375/260 |
| 2006/0062283 A1* | 3/2006 | Zhang et al. | 375/147 |
| 2006/0092902 A1* | 5/2006 | Schmidt | 370/342 |
| 2006/0105767 A1* | 5/2006 | Kim | 455/434 |
| 2006/0146962 A1 | 7/2006 | Troya et al. | |
| 2006/0222095 A1 | 10/2006 | Niu et al. | |
| 2007/0092110 A1* | 4/2007 | Xu et al. | 382/103 |
| 2007/0127603 A1* | 6/2007 | Niu et al. | 375/341 |

OTHER PUBLICATIONS

E. Zehavi, "8—PSK trellis codes for a Rayleigh channel", IEEE Transactions on Communications, vol. 40, Issue: 5, May 1992, pp. 873-884.

T.M. Schmidl and D.C. Cox, "Robust frequency and timing synchronization for OFDM," IEEE Transactions On Communications, Dec. 1997, pp. 1613-1621, vol. 45, No. 12.

H. Minn, M. Zeng and V.K. Bhargava, "On timing offset estimation for OFDM systems," IEEE Communications Letters, Jul. 2000, pp. 242-244, vol. 4, No. 7.

J. Li, G. Liu and G.B. Giannakis, "Carrier frequency offset estimation for OFDM-Based WLANs" IEEE Signal Processing Letters, Mar. 2001, pp. 80-82, vol. 8, No. 3.

Byungjoon Park, et al. "A Novel Timing Estimation Method for OFDM Systems" IEEE Communications Letters, vol. 7, No. 5, May 2003, pp. 239-241.

U.S. Non-Final Office Action for U.S. Appl. No. 11/100,239 mailed Dec. 10, 2007.

U.S. Non-Final Office Action for U.S. Appl. No. 11/100,239 mailed Jun. 13, 2008.

U.S. Non-Final Office Action for U.S. Appl. No. 11/100,239 mailed Oct. 30, 2008.

* cited by examiner

METHOD OF SOFT BIT METRIC CALCULATION WITH DIRECT MATRIX INVERSION MIMO DETECTION

FIELD OF THE INVENTION

The present invention relates generally to data communication, and more particularly, to data communication in multi-channel communication system such as multiple-input multiple-output (MIMO) systems.

BACKGROUND OF THE INVENTION

A multiple-input-multiple-output (MIMO) communication system employs multiple transmit antennas and multiple receive antennas for data transmission. A MIMO channel formed by the transmit and receive antennas may be decomposed into independent channels, wherein each channel is a spatial subchannel (or a transmission channel) of the MIMO channel and corresponds to a dimension. The MIMO system can provide improved performance (e.g., increased transmission capacity) if the additional dimensionalities created by the multiple transmit and receive antennas are utilized.

As a solution to the high capacity requirement of future wireless systems, a lot of attention has been drawn to MIMO wireless systems. One possible transmission scenario is to transmit different data streams in parallel simultaneously. In this case, all transmitted streams experience different channel signature, and are received overlapped at the receiver antennas. Therefore, the receiver needs to perform multi-signal detection. In terms of performance, the maximum likelihood bit metric detection is the optimal. However, the computational complexity goes exponentially with respect to constellation size and the number of transmitter antennas.

There is, therefore, a need for a suboptimal approach which first detects the symbol using linear detector, followed by a soft posterior probability (APP) processing.

BRIEF SUMMARY OF THE INVENTION

The present invention addresses the above shortcomings. In one embodiment the present invention provides a method of soft bit metric calculation for received data signals in a telecommunications receiver, comprising the steps of: detecting data symbols in the received signal using direct matrix inversion type of linear MIMO detection (ZF detection or MMSE detection); determining distances between detected symbol points and constellation points; scaling the distances using a scaling factor; and using the scaled distances to calculate scaled soft bit metrics. Further, the soft bit metrics are decoded to determine data values in the received signals. Preferably, the scaled soft bit metrics are dynamically quantized before decoding.

In another embodiment, the soft bits metrics are scaled to reduce their effect on path metrics when the distances are not accurate. Preferably, the soft bits metrics are scaled to small values to reduce their effect on path metrics. The steps of scaling further include the steps of using the diagonal elements of a noise variance matrix as scaling factors. Further, the soft bit metric of a first received data stream is divided by a first diagonal element of the noise variance matrix, and the soft metric of a second received data stream divided by a second diagonal element of the noise variance matrix. The steps of scaling can further include the steps of performing direct matrix inversion. Preferably, the receiver comprises a wireless MIMO receiver which receives multiple data streams signals from a transmitter with multiple antennas.

In another embodiment, the present invention provides a receiver that implements the method of the present invention, wherein the receiver comprises a detector that detects data symbols in the received signal by direct matrix inversion MIMO detection and determines the distances between received signal points and constellation points; a scaler that scales the distances using a scaling factor; and a soft bit metric calculator that uses the scaled distances to calculate scaled soft bit metrics. The receiver can further comprise a decoder that decodes the soft bit metrics to determine data values in the received signals. Preferably, the receiver further comprises a quantizer that dynamically quantizes the soft bit metrics before decoding by the decoder.

These and other features, aspects and advantages of the present invention will become understood with reference to the following description, appended claims and accompanying figures.

BRIEF DESCRIPTION OF THE DRAWINGS

In the drawings, like reference numbers refer to like elements.

DETAILED DESCRIPTION OF THE INVENTION

In a MIMO telecommunication system, when different data streams are transmitted in parallel simultaneously, all transmitted streams experience different channel signature. The data streams are received overlapped at the receiver antennas, whereby the receiver performs multi-signal detection. This optimal approach allows maximum likelihood bit metric detection at the expense of exponential increase in computational complexity in relation to constellation size and the number of transmitter antennas. In one embodiment, the present invention provides a suboptimal approach to address the computational complexity of the optimal approach. Accordingly, an example metric calculation method according to the present invention first detects an incoming symbol using a linear detector, and then performs a soft posterior probability (APP) processing.

An example implementation of such a method according to the present invention is described in relation to an example MIMO system having a transmitter TX with $N_t$ transmitter antennas and a receiver RX with $N_r$ receiver antennas. The signal R received at the receiver can be represented as $R=HS+N$ where R is $N_r \times 1$ vector, H is $N_r \times N_t$ matrix, S is the $N_t \times 1$ transmitted signal vector, and N is $N_r \times 1$ received noise vector.

Figure 1:
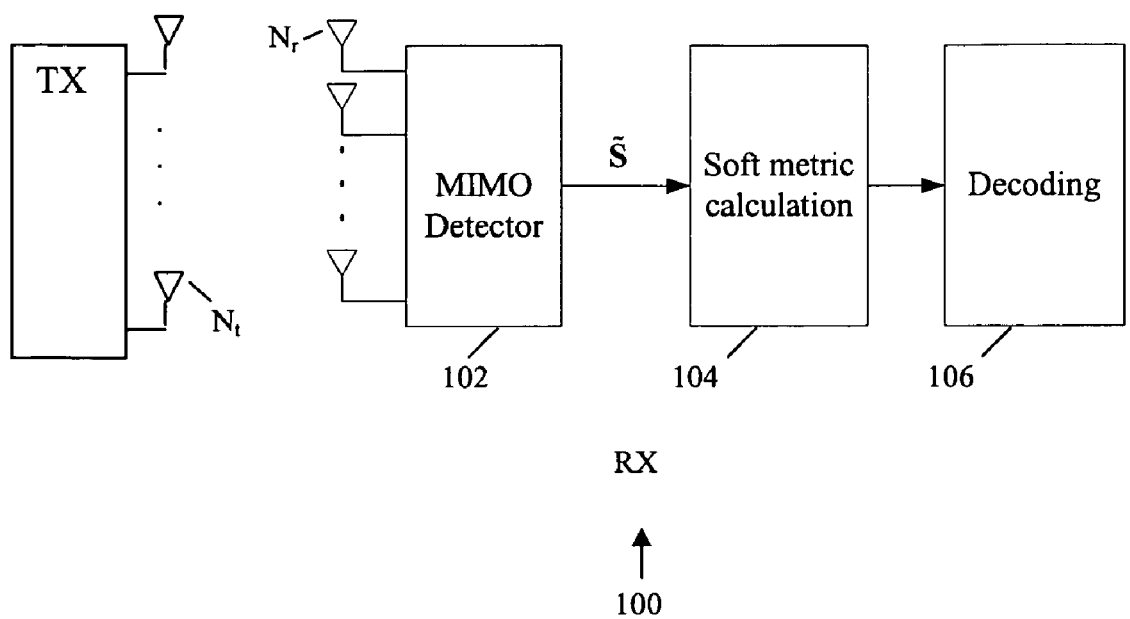
FIG. 1 shows a block diagram of a conventional receiver for soft decoding with a linear MIMO detector.

The transmitted signal can be estimated at the receiver as $\tilde{S}=H^+R=H^+HS+H^+N$, where $H^+$ is the pseudo-inverse which can be calculated according to the Zero Forcing (ZF) or Minimum Mean Square Error (MMSE) criterion. Then, soft bit metrics used in an outer error correction coding can be calculated from the estimated symbol $\tilde{S}$. FIG. 1 shows a block of a conventional receiver (RX) 100 that receives data signals from the transmitter TX, wherein the receiver 100 provides soft decoding using a linear MIMO detector implementing signal estimation from the estimated symbol $\tilde{S}$. The receiver in FIG. 1 comprises a MIMO Detector 102, a Soft Metric Calculator 104 and a Decoder 106. The MIMO detector 102 inputs the received signal, performs MIMO detection using ZF or MMSE criterion (i.e., calculates H$^+$R), and outputs the estimated symbol $\tilde{S}$.

The Soft metric calculator 104 inputs the estimated symbol $\tilde{S}$, calculates the bit metric by determining the distance between $\tilde{S}$ and the constellation points, and outputs the bit metrics. The decoder 106 inputs the bit metrics, performs Viterbi decoding and outputs decoded information bits.

The symbols of the received signal are processed in the MIMO detector 102, one vector symbol at a time, to determine the individual transmitted signals, wherein a vector symbol comprises symbols received on the receive antennas during a symbol period. The Soft Metric Calculator 104 converts the symbols into bit space to obtain soft value bits which indicate if a received bit is a one or zero, and its certainty.

The bit metrics can be calculated by the Soft Metric Calculator 104 by finding the distance between $\tilde{S}$ and the constellation point (as in a single input single output (SISO) case) via the log-likelihood ratio (LLR) as in relation (1) below implemented in the Soft Metric Calculator 104:

$$LLR_{ji} + m_{ji}^1 - m_{ji}^0 = \min_{a \in C_i^1} \|\tilde{s}_j - a\|^2 - \min_{a \in C_i^0} \|\tilde{s}_j - a\|^2, \quad (1)$$

where $C_i^p$ represents the subset of the constellation point such that bit i is equal to p, p$\in$\{0,1\}.

Figure 2:
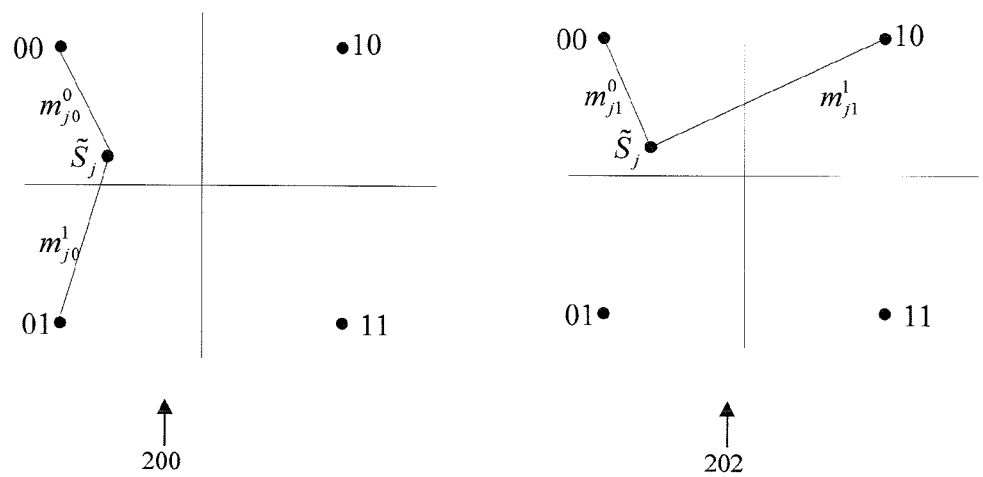
FIG. 2 shows an example of distance computation using QPSK.

An example implementation of distance calculation using Quadrature Phase Shift Keying (QPSK) modulation is shown by example diagrams 200 and 202 in FIG. 2, and described by example in: (1) G. D. Golden, C. J. Foschini, R. A. Valenzuela and P. W. Wolniansky, "Detection algorithm and initial laboratory results using V-BLAST space-time communication architecture," Electronics Letters, Vol. 35, No. 1, and (2) E. Zehavi, "8-PSK trellis codes for a Rayleigh channel", IEEE Transactions on Communications, Volume: 40, Issue: 5, May 1992, Pages: 873-884, incorporated herein by reference.

FIG. 2 shows an example of calculating relation (1) using QPSK. For Gray labeled QPSK constellation, there are 4 symbols: $(1+j)/\sqrt{2}$, $(-1+j)/\sqrt{2}$, $(-1-j)/\sqrt{2}$ and $(1-j)/\sqrt{2}$, which are mapped with 2 bits (b1b0), corresponding to 10, 00, 01, 11. When there is an estimated symbol at $j^{th}$ time slot $\tilde{S}_j$, which is a QPSK symbol, the soft bit information (b1 and b0) must be determined from $\tilde{S}_j$. Taking b0, for example (graph 200 in FIG. 2), both constellation points $(1+j)/\sqrt{2}$ (labeled as 10) and $(-1+j)/\sqrt{2}$ (labeled as 00) have b0equals 0. As such, for b0=0, the minimum distance of $\tilde{S}_j$ to $(1+j)/\sqrt{2}$ and $(-1+j)/\sqrt{2}$ must be determined. In graph 200, the minimum distance, $$\min_{a \in C_i^0} \|\tilde{s}_j - a\|^2,$$

is the distance between $\tilde{S}_j$ and $(-1+j)/\sqrt{2}$. Similarly, for b0=1, $$\min_{a \in C_i^1} \|\tilde{s}_j - a\|^2$$

is the minimum distance between $\tilde{S}_j$ and $(-1-j)/\sqrt{2}$. The soft metric for b0 is therefore equal to $LLR_{ji} = m_{ji}^1 - m_{ji}^0$ for i=0.

Graph 202 in FIG. 2 show the case for b1. Both the constellation point $(-1+j)/\sqrt{2}$ (labeled as 00) and $(-1-j)/\sqrt{2}$ (labeled as 01) have b1=0. As such, $$m_{ji}^0 = \min_{a \in C_i^0} \|\tilde{s}_j - a\|^2$$

is the distance between $\tilde{S}_j$ and $(-1+j)/\sqrt{2}$. Similarly, for B1=1, $$m_{ji}^1 = \min_{a \in C_i^1} \|\tilde{s}_j - a\|^2$$

is the distance between $\tilde{S}_j$ and $(1+j)/\sqrt{2}$ $LLR_{ji} = m_{ji}^1 - m_{ji}^0$, i=1 is the distance shown as 202.

Figure 3:
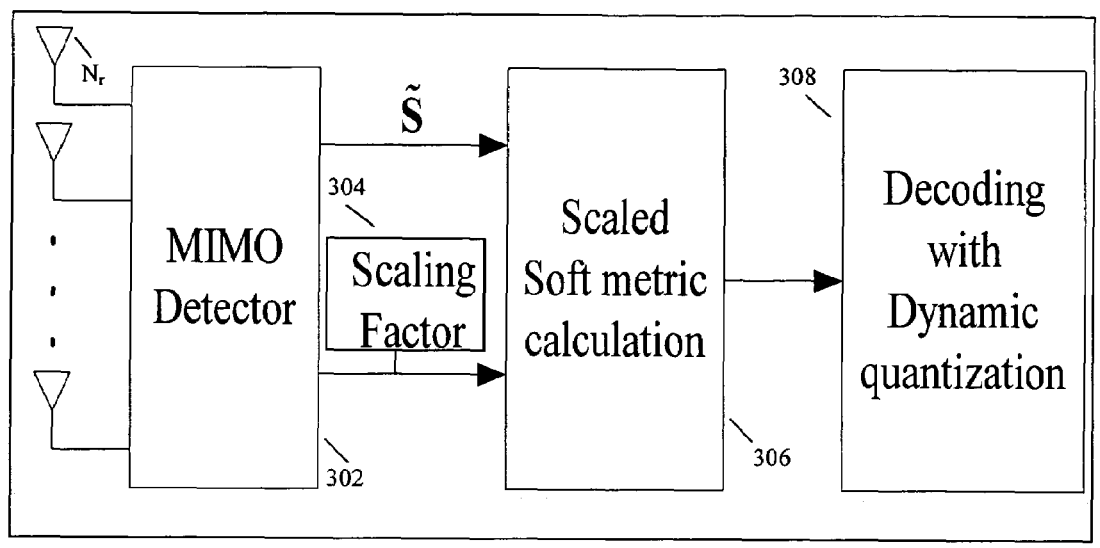
FIG. 3 shows an example functional block diagram of a receiver according to an embodiment of the present invention.

FIG. 3 shows a block diagram of an example receiver 300 according to an embodiment of the present invention which provides improved soft metric calculation after the linear matrix inversion MIMO detection. The receiver in FIG. 3 comprises a MIMO Detector 302, a Scaling function 304, a Scaled Soft Metric Calculator (SSC) 306 and a Decoder Dynamic Qauntizer (DDQ) 308. The soft metric is calculated by the SSC 306 and then dynamically quantized by the DDQ 308 before further processing by a soft Viterbi detector in the DDQ 308. Specifically, the MIMO detector 302 inputs the received signal, performs MIMO detection using ZF or MMSE criterion (i.e., calculate H$^+$ and H$^+$R), and outputs the estimated symbols $\tilde{S}$ and H$^+$. The Scaling Function block 304 inputs the symbol H$^+$, calculates the noise variance matrix E\{H$^+$NN$^H$H$^{+H}$\}, and outputs diagonal element of the noise variance matrix, i.e., the scaling factor. The Scaled soft metric calculator 306 inputs the estimated symbol $\tilde{S}$ and the scaling factor, calculates the bit metric by determining the distance between $\tilde{S}$ and the constellation points, scales the distance using the scale factor, and outputs the soft bit metrics. The Decoder Dynamic Qauntizer 308 inputs the soft bit metrics, quantizes the soft bit metric using a fixed number of bits (depending on detailed implementation and hardware) wherein the dynamic range is adaptively adjusted based on the variance of the soft metric and number of quantization bits, performs Viterbi decoding, and outputs decoded information bits.

After the distance computation in the MIMO Detector 302, the distance is scaled in the Scaling function 304 by a scaling factor before further processing by the soft Viterbi decoder in the DDQ 308. The scaling factor is used herein because when performing linear detection, the detector 302 multiples the inverse of the channel matrix to the received signal. If the channel is ill-conditioned, the noise will be very large, whereby the soft bit metric is far from the correct value. When applied to the soft Viterbi decoder, this may lead to an entire incorrect trellis path in the Viterbi decoder. Therefore, according to an embodiment of the present invention, the soft metric is scaled to a very small value, such that even if it is incorrect, it would not unduly contribute to the path metrics in the soft Viterbi detector.

Mathematically, the noise after the linear detection by the ZF MIMO Detector 302 becomes H$^+$N, which has a variance of E\{H$^+$NN$^H$H$^{+H}$\}=H$^+$H$^{+H}$/$\sigma^2$ (where E\{ \} is the expectation operation, and superscript H means conjugate transpose).

It can be verified that when the channel condition is large, the off-diagonal part of the noise covariance matrix E\{H$^+$NN$^H$H$^{+H}$\} is very large. Whitening this colored noise is computationally expensive (rising exponentially with the number of transmitter antennas). Accordingly, the present invention utilizes a suboptimal approach, using only e.g. the diagonal part of the noise variance matrix for scaling the soft metric.

Channel condition is defined as the largest eigen-value of the channel matrix H over the smallest eigen-value of H. Large condition number means the MIMO channels are not orthogonal to each other, therefore, it is very difficult to decouple them into multiple parallel channels. As a result, the estimated symbol $\tilde{S}$ is less reliable.

In one example scaling implementation in the Scaling function 304, the soft bit metric of a first data stream is divided by the first diagonal element, the soft metric of a second data stream divided by the second diagonal element and so on, i.e., $$LLR'_{ji} = \frac{LLR_{ji}}{\|H_j^+\|_2},$$

where $H_j^+$ is the $j^{th}$ row of $H^+$, and $\|H_j^+\|_2$ is the vector norm.

Because of said scaling, the dynamic range of the soft bit metric is much larger than the original soft metric. Therefore, the soft bit metric is dynamically quantized in the DDQ 308 as described to cope with this large dynamic range. In one example, dynamic quantization is implemented as follows. The hardware implementation of the Viterbi decoder requires quantized soft bit information. More bits used for quantization provide more accurate results, at the expense of more complicated hardware. Once the number of quantized bits is fixed, there is a tradeoff between dynamic range and precision. If the dynamic range is selected to be small, it results in large overflow when quantizing. If the dynamic range is selected to be large, then there is a loss in precision, resulting in many zeros after scaling. Therefore, the dynamic range should be selected based on the detailed implementation (number of bits used in the Viterbi decoder), statistical information of the soft metrics, etc.

The inventors have found that with limited bit quantization (e.g., 10 bits) there are many zeros in the quantized information. This will cause decoding failure for punctured codes, especially ¾ rate. Therefore, the scaling is further adjusted to $$LLR'_{ji} = \frac{LLR_{ji}}{\sqrt{\|H_j^+\|_2}}$$

for punctured codes.

Figure 4:
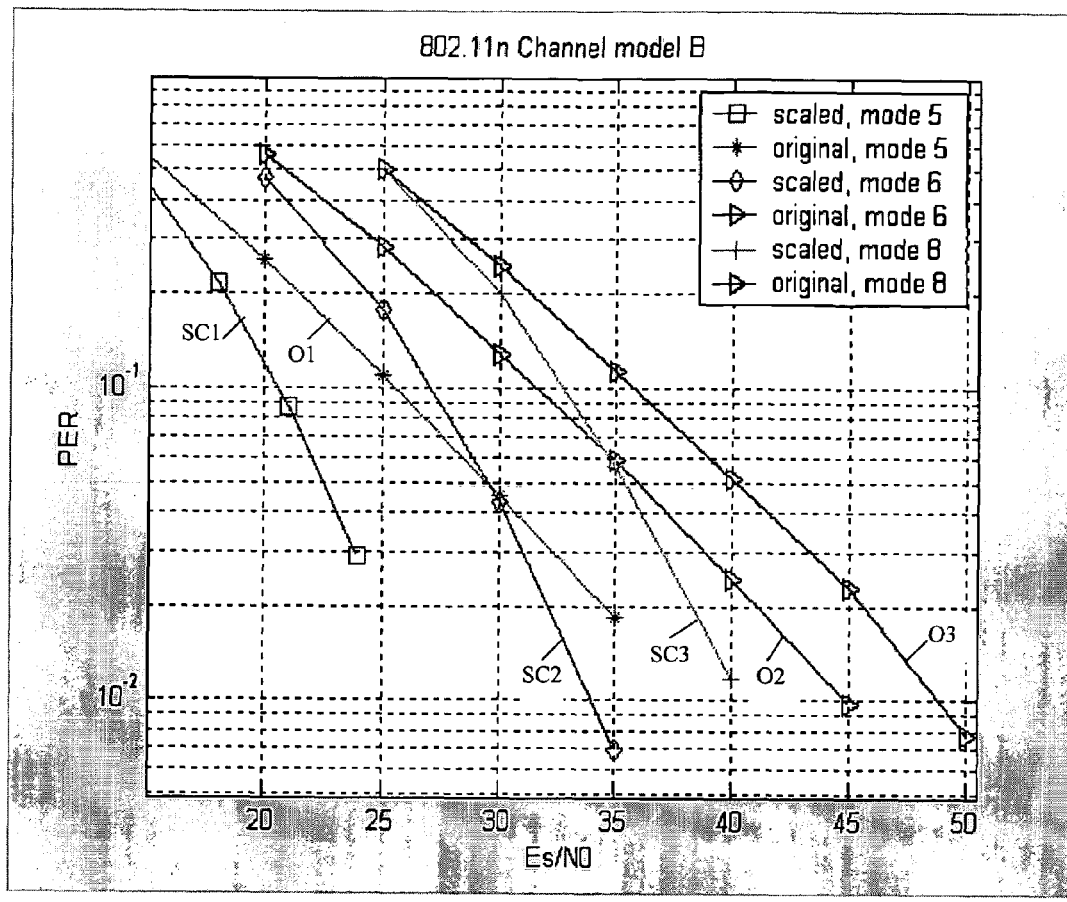
FIG. 4 shows an example performance comparison of a receiver with soft bit metric calculation and dynamic quantization, in relation to conventional receivers over 802.11n channel model B.
Figure 5:
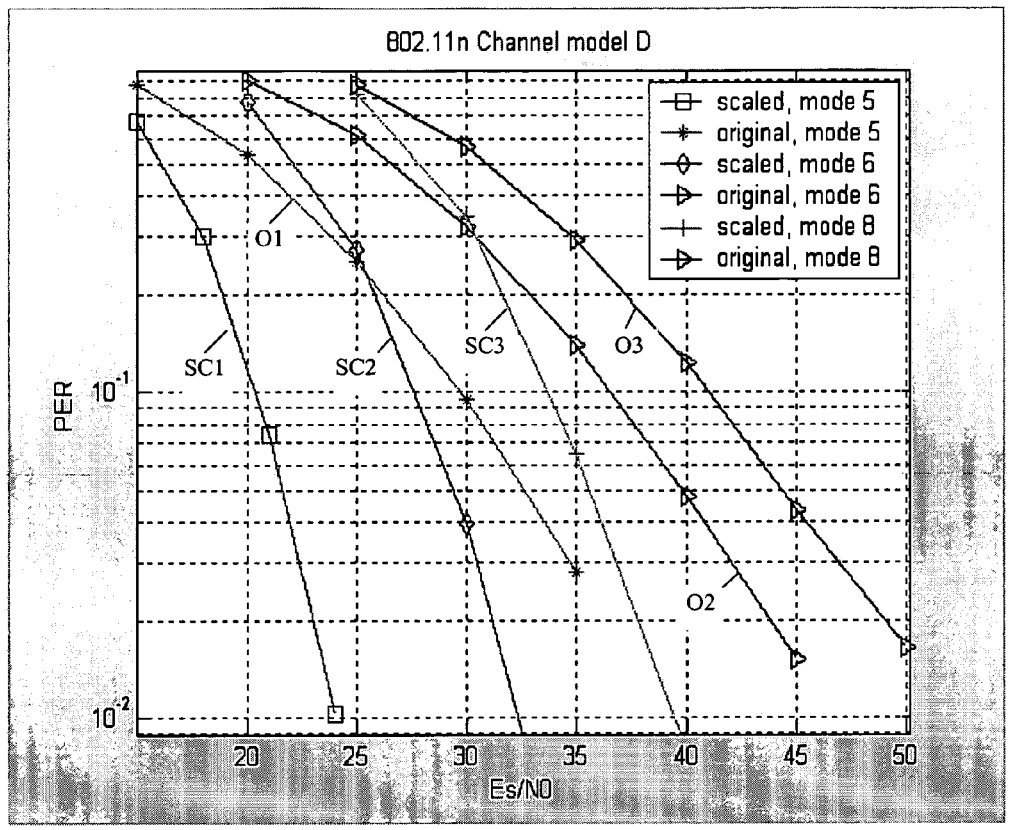
FIG. 5 shows an example performance comparison of a receiver with soft bit metric calculation and dynamic quantization, in relation to conventional receivers over 802.11n channel model D.

Similar dynamic quantization still applies. FIG. 4 shows example performance comparison of scaled soft metric calculation with dynamic quantization according to the present invention, and the conventional approach over the 802.11n channel model B. FIG. 5 shows example performance comparison of soft metric calculation with dynamic quantization according to the present invention, and the conventional approach over the 802.11n channel model D.

As shown in FIGS. 4-5, example simulation shows that utilizing a receiver 300 according to the present invention provides more than e.g. 10 dB gain compared with the conventional (original) soft bit metric as calculated in relation (1) above without scaling (e.g., as in original/conventional receiver 100 of FIG. 1). In the examples of FIGS. 4-5, results from a conventional/original receiver are designated by O1, O2 and O3, corresponding to results from a receiver according to an embodiment of the present invention, designated as SC1, SC2 and SC3, respectively. In the simulation example of FIGS. 4-5, the constrained length in the soft Viterbi detector is set to e.g. 34. Using larger constrained length results in better performance in both cases. The modes in FIGS. 4-5, are defined as the modulation and coding combination similar to 802.11a. Mode 5 reflects 16QAM ½ coding, mode 6 reflects 64QAM with ⅔ coding, mode 8 reflects use 64QAM with ¾ coding.

The same scaling factor $\|H_j^+\|_2$ for ½ codes or $$\sqrt{\|H_j^+\|_2}$$

for punctured codes can be applied to the matrix inversion type of MIMO detector. For MIMO detector follows the ZF criterion, $H^+=H^H(H^HH)^{-1}$. For MIMO detector follows the MMSE criterion, $H^+=H^H(H^HH+I/\sigma^2)^{-1}$.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of soft bit metric calculation for received data signals in a telecommunications receiver, comprising:
  employing a processor for:
  performing Multiple Input Multiple Output (MIMO) detection for the received signal and determining estimated data symbols and a pseudo inverse H+ of a $N_r \times N_t$ matrix;
  calculating a diagonal element of a noise variance matrix obtained from $H^+$;
  determining distances between the estimated data symbols and constellation points; and
  scaling the distances using the diagonal element to calculate scaled soft bit metrics, wherein the soft bit metrics are calculated based on determining a log-likelihood ratio (LLR) as $$LLR'_{ji} = \frac{LLR_{ji}}{\|H_j^+\|_2}, \text{ where } H_j^+ \text{ is the } j^{th} \text{ row of } H^+, \|H_j^+\|_2$$

is the vector norm, and i and j are positive integers.

2. The method of claim 1 further including decoding the soft bit metrics to determine data values in the received signals.

3. The method of claim 2 further including-dynamically quantizing the soft bit metrics before decoding.

4. The method of claim 1 wherein the soft bits metrics are scaled to reduce their bad effect on path metrics.

5. The method of claim 4 wherein the soft bits metrics are scaled to small values to reduce their effect on path metrics.

6. The method of claim 5 wherein the soft bit metric of a first received data stream is divided by a first diagonal element of the noise variance matrix, and the soft metric of a second received data stream divided by a second diagonal element of the noise variance matrix.

7. The method of claim 1 wherein the receiver comprises a wireless MIMO receiver.

8. The method of claim 7 wherein the receiver receives multiple data streams signals from a transmitter with multiple antennas.

9. The method of claim 1 wherein:
the performing MIMO detection further includes detecting data symbols in the received signal using direct matrix inversion type linear MIMO detection.

10. A telecommunications receiver, comprising:
a detector configured to perform Multiple Input Multiple Output (MIMO) detection for the received signal by determining estimated symbols and a pseudo inverse matrix of a matrix based on a number of receivers and transmitters;
a scaler that calculates a diagonal element of a noise variance matrix obtained from the pseudo inverse matrix; and
a soft bit metric calculator that calculates distances between the estimated symbols and constellation points, and scales the distances using the diagonal element of the noise variance matrix to calculate scaled soft bit metrics, wherein the soft bit metrics are calculated based on a log-likelihood ratio (LLR) of:

$$LLR'_{ji} = \frac{LLR_{ji}}{\|H_j^+\|_2}, \text{ where } H_j^+ \text{ is the } j^{th} \text{ row of } H^+, \text{ and } \|H_j^+\|_2$$

is the vector norm, i and j being positive integers.

11. The receiver of claim 10 further including a decoder that decodes the soft bit metrics to determine data values in the received signals.

12. The receiver of claim 11 further including a quantizer that dynamically quantizes the soft bit metrics before decoding by the decoder.

13. The receiver of claim 10 wherein the soft bits metrics are scaled to reduce their effect on path metrics when the channel is ill-conditioned.

14. The receiver of claim 13 wherein the soft bits metrics are scaled to small values to reduce their effect on path metrics when the channel is ill-conditioned.

15. The receiver of claim 14 wherein the scaler divides the soft bit metric of a first received data stream by a first diagonal element of the noise variance matrix, and divides the soft metric of a second received data stream by a second diagonal element of the noise variance matrix.

16. The receiver of claim 10 wherein the receiver comprises a MIMO wireless receiver.

17. The receiver of claim 16 wherein the receiver receives multiple data streams signals from a transmitter with multiple antennas.

18. The method of claim 1, further comprising:
adjusting the scaling for punctured codes.

19. The method of claim 1, wherein the distance is determined using Quadrature Phase Shift Keying modulation.

20. The method of claim 1, wherein the scaling factor is determined separately from the distance determination.

21. The method of claim 1, wherein scaling is further adjusted based on $$LLR'_{ji} = \frac{LLR_{ji}}{\sqrt{\|H_j^+\|_2}}$$

for punctured codes.

22. The receiver of claim 10, wherein the scaled distances are further adjusted based on determining a log-likelihood ratio (LLR) of:

$$LLR'_{ji} = \frac{LLR_{ji}}{\sqrt{\|H_j^+\|_2}}$$

for punctured codes, where $H_j^+$ is the $j^{th}$ row of $H^+$, $\|H_j^+\|_2$ is the vector norm, and i and j are positive integers.

23. A method of soft bit metric calculation for received data signals in a telecommunications receiver, comprising:
employing a processor for:
performing Multiple Input Multiple Output (MIMO) detection for the received signal and determining estimated data symbols and a pseudo inverse H+ of a $N_r \times N_t$ matrix;
calculating a diagonal element of a noise variance matrix obtained from H+;
determining distances between the estimated data symbols and constellation points; and
scaling the distances using the diagonal element to calculate scaled soft bit metrics,
wherein the scaling is further adjusted based on determining a log-likelihood ratio (LLR) of:

$$LLR'_{ji} = \frac{LLR_{ji}}{\sqrt{\|H_j^+\|_2}}$$

for punctured codes, where $H_j^+$ is the $j^{th}$ row of H+, $\|H_j^+\|_2$ is the vector norm, and i and j are positive integers.

24. A telecommunications receiver, comprising:
a detector configured to perform Multiple Input Multiple Output (MIMO) detection for the received signal by determining estimated symbols and a pseudo inverse matrix of a matrix based on a number of receivers and transmitters;
a scaler that calculates a diagonal element of a noise variance matrix obtained from the pseudo inverse matrix; and
a soft bit metric calculator that calculates distances between the estimated symbols and constellation points, and scales the distances using the diagonal element of the noise variance matrix to calculate scaled soft bit metrics,
wherein the scaled distances are further adjusted based on determining a log-likelihood ratio (LLR) of:

$$LLR'_{ji} = \frac{LLR_{ji}}{\sqrt{\|H_j^+\|_2}}$$

for punctured codes, where $H_j^+$ is the $j^{th}$ row of H+, $\|H_j^+\|_2$ is the vector norm, and i and j are positive integers.

25. A telecommunications receiver, comprising:
a linear detector configured to perform Multiple Input Multiple Output (MIMO) detection for the received signal by determining estimated symbols and a pseudo inverse matrix of a matrix based on a number of receivers and transmitters;
a scaler that calculates a diagonal element of a noise variance matrix obtained from the pseudo inverse matrix; and
a soft bit metric calculator that performs soft posterior probability (APP) processing to calculate distances between the estimated symbols and constellation points, and scales the distances using the diagonal element of the noise variance matrix to calculate scaled soft bit metrics; wherein the soft bit metrics are calculated based on determining a log-likelihood ratio (LLR) as $LLR_{ji}'=LLR_{ji}/\|H_j^+\|_2$, where $H_j^+$ is the $j^{th}$ row of $H^+$, $\|H_j^+\|_2$ is the vector norm, and i and j are positive integers.

* * * * *